Patented May 26, 1936

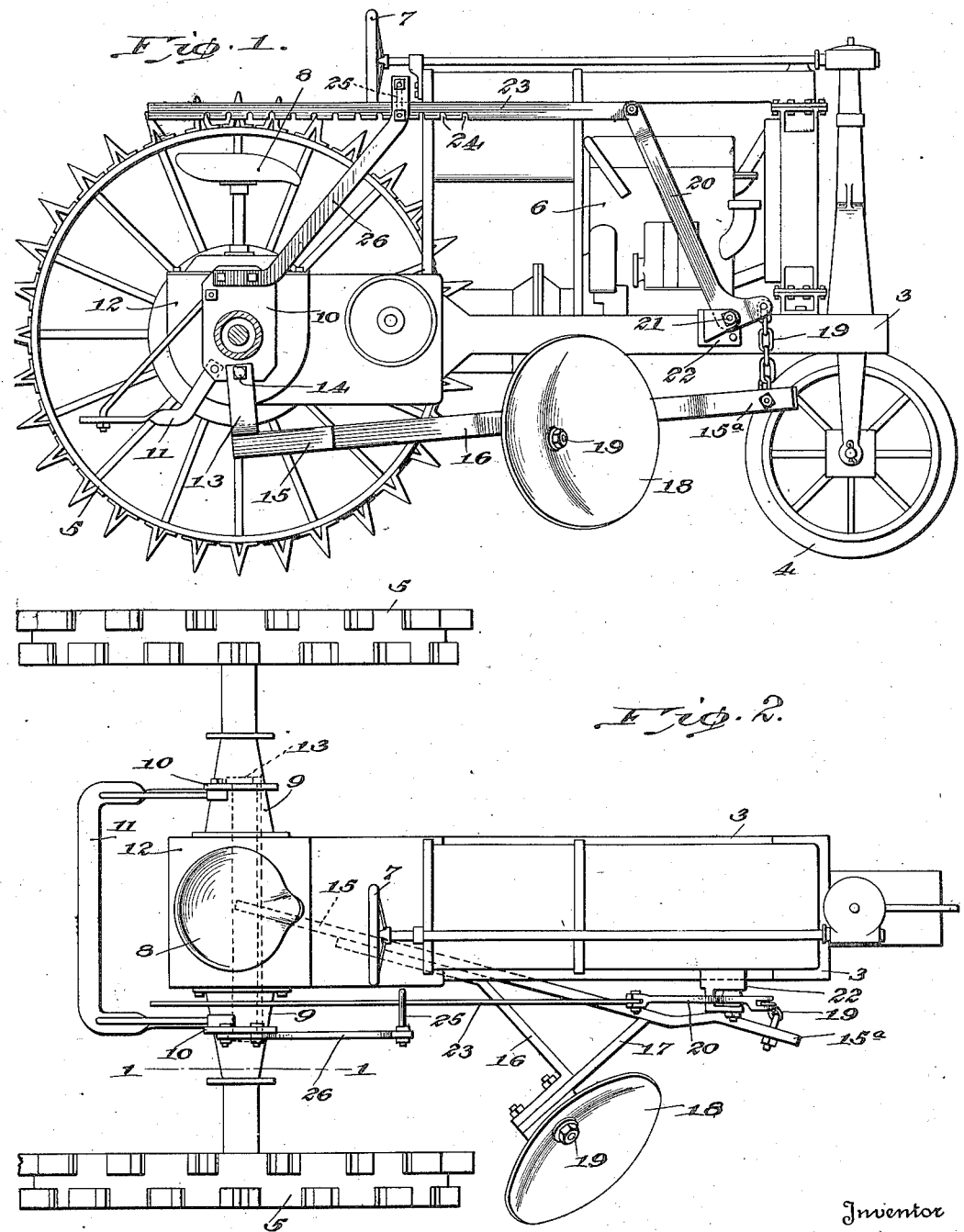

2,041,832

UNITED STATES PATENT OFFICE 2,041,832

PLOW ATTACHMENT FOR TRACTORS

Levi C. Hester, Jacksonville, Fla.

Application February 25, 1935, Serial No. 8,193

4 Claims. (Cl. 97—47)

My invention relates to improvements in plow attachments for tractors, and it consists in the combinations, constructions and arrangements herein described and claimed.

An object of my invention is to improve that form of plow attachment which forms the subject of Patent 1,456,817, issued to B. W. Morton on May 29, 1923. In said prior patent the frame bearing a plow disk was connected at the draw bar of the tractor in the rear of the axis of the drive wheels, and this tends to swing the tractor out of alinement, the result being that the driver is continually turning the steering wheel to bring it back into proper position.

Furthermore, in the device shown in the patent aforesaid, the means for raising and lowering the disk and for maintaining it in adjusted positions required the use of a guide member.

An object of the present invention is to provide a plow disk attachment which is carried by a frame which is so mounted as to obviate any tendency to swing the tractor out of the direction in which it is headed, without however sacrificing the effective action of the disk.

A further object of the invention is to provide means for raising and lowering the disk which eliminates the necessity of guide means at the forward end, thus rendering the device more simple and reducing the cost.

A further object of the invention is to provide an attachment in which the disk is disposed below the plane of the connection of its supporting frame with the tractor, thereby making a better cut than otherwise would be possible.

Other objects and advantages will appear in the following specification and the novel features of the invention will be particularly pointed out in the appended claims.

My invention is illustrated in the accompanying drawing forming part of this application, in which:

Figure 1 is a side view of the device as used with a tractor, a portion being shown in section along the line 1—1 of Fig. 2.

Figure 2 is a plan view of the device.

The tractor which is illustrated in the present instance may be one of any suitable type. The frame of this tractor is shown at 3, the front wheels at 4, the drive wheels at 5, the motor at 6, the steering wheel at 7 and the seat at 8. The rear axle housing 9 on each side has a flange 10, and it is to this flange or plate that the draw bar 11 is secured. The draw bar in the present instance is shown as being U-shaped and as spanning the differential housing 12.

I make use of this plate or flange 10 in attaching the plow disk. To this end I provide a U-shaped member 13 which is disposed underneath the differential housing, the arms of the U-shaped member being pivotally attached to the plates 10 at 14 on the outside of the plate. It will be observed that the draw bar 11 is on the opposite side of the plate, that is on the inside.

At the central longitudinal axis of the tractor, and in the vertical plane through the axis of the drive wheels, I weld or otherwise secure to this U-shaped member 13 a bar 15 which is angularly inclined with respect to the longitudinal axis of the machine, as shown in Fig. 2. The outer end of this bar constitutes, in connection with the bars 16 and 17, a supporting frame, which, being rigidly attached to the U-shaped member 13, is pivotally suspended from the plates 10 on opposite sides of the tractor, in the vertical plane through the axis of the drive wheels.

It will be seen that the frame members 16 and 17 form means whereby the disk 18 is pivotally mounted on a stub shaft 19 in a position to precede the drive wheel 5 in the rear.

The bar 15 is bent inwardly and has a portion 15a which is substantially parallel with the main bar. The portion 15a is connected by a chain 19 with one end of a bell-crank lever 20, which is pivotally mounted at 21 on a bracket 22 carried by the frame 3 of the tractor. At the upper end of the bell-crank lever 20 is a bar 23 having notches 24. This bar 23 passes through a U-shaped retaining member 25, which is fastened to an arm 26, the latter being secured to the plate 10 above the axle housing, as shown in Fig. 1. The notches 24 are formed to receive the lower portion of the U-shaped member 25, so as to hold the bar 13 in its adjusted position.

From the foregoing description of the various parts of the device, the operation thereof may be readily understood. As previously stated, the attachment of the frame, which bears the disk, to the rear of the point of application of the power, i. e., to the rear of the central axial line of the drive wheels, causes the tractor to veer. In the present instance it will be seen that the frame is secured in such a manner that the application of power is at the point of attachment of the frame, and furthermore, that the resistance set up by the frame and the plow is transmitted in such a manner that the force is evenly received on each side of the central longitudinal axis, the resultant of these forces being directed toward the point which forms the intersection of the longitudinal axis of the tractor and the vertical plane through the central axis of the drive wheels. Hence there is no tendency for the plow to slue around.

The U-shaped member 13 provides a pivoted part to which the frame, bearing the disk plow, is rigidly connected, so that when it is desired to raise the plow the bar 13 is lifted from its locking member 25, pulled rearwardly and the bar is dropped so that another notch engages the lower portion of the U-shaped stop 25 and the plow may be held in the position shown in Fig. 1. In this position the tractor and its attachment may proceed from the barn to the field.

Now by raising the bar 23 so that the notches 24 clear the stop member 25, the disk will fall down by gravity to the ground, and as the tractor has started the resistance of the disk in the ground will tend to move it downwardly. When the proper distance is attained, then the bar is lowered so as to lock the disk in desired position. By backing the tractor slightly the disk is freed and may be raised and held in raised position, as stated.

I claim:—

1. A plow attachment for tractors having drive wheels comprising a frame, a disk rotatably carried by said frame, and a supporting member pivotally mounted at two points equi-distant from the longitudinal central axis of the tractor and in a vertical plane through the axis of the drive wheels and rigidly connected with said frame at the junction of the central longitudinal axis and said vertical plane.

2. A plow attachment for tractors having drive wheels comprising a frame, a disk rotatably carried by said frame, and a supporting member pivotally mounted at two points equi-distant from the longitudinal central axis of the tractor and in a vertical plane through the axis of the drive wheels rigidly connected with said frame at the junction of the central longitudinal axis and said vertical plane, said frame being disposed angularly with respect to the longitudinal axis of the tractor and said disk being positioned in front of one of said drive wheels.

3. A plow attachment for tractors having drive wheels, an axle housing and a differential housing, comprising a U-shaped supporting member spanning the differential housing of the tractor and being attached to the axle housing at two points equi-distant from the longitudinal central axis of the tractor and in a vertical plane through the axis of the drive wheels, a frame rigidly secured to said supporting member at the central portion thereof and angularly inclined with respect to the longitudinal axis of the tractor, and a disk rotatably carried by the frame on an axis inclined with respect to the longitudinal axis of the tractor.

4. The combination with a tractor having drive wheels and a rear axle housing provided with laterally extending flanges spaced from each other at the same distance from the central longitudinal axis of the tractor, of a U-shaped supporting member pivotally attached to said spaced apart flanges in a vertical plane through the central axis of the drive wheels, a frame rigidly connected with the central part of said U-shaped supporting member, said frame extending angularly with respect to the central longitudinal axis of the tractor, and a disk rotatably carried by said frame on an axis inclined with respect to the longitudinal axis of the tractor, said disk being positioned in front of one of said drive wheels.

LEVI C. HESTER.